United States Patent
Aronne

[11] Patent Number: 5,308,715
[45] Date of Patent: May 3, 1994

[54] AIRCRAFT SYSTEM BATTERY PACK

[75] Inventor: Armand J. Aronne, South Massapequa, N.Y.

[73] Assignee: Grumman Aerospace Corporation, Bethpage, N.Y.

[21] Appl. No.: 109,216

[22] Filed: Aug. 19, 1993

[51] Int. Cl.$^5$ .................. H01M 10/48; H01M 2/10
[52] U.S. Cl. ........................... 429/91; 429/93; 429/97; 429/123
[58] Field of Search ................... 429/90–93, 429/96–100, 121, 123; 340/636; 307/150

[56] References Cited

U.S. PATENT DOCUMENTS

| | | | |
|---|---|---|---|
| 1,568,829 | 1/1926 | Goff | 429/93 |
| 2,081,656 | 5/1937 | Anthony | 429/91 |
| 3,460,995 | 8/1969 | Webb | 429/93 |

*Primary Examiner*—Anthony Skapars
*Attorney, Agent, or Firm*—Collard & Roe

[57] ABSTRACT

An aircraft system battery pack is housed in a housing having a removable cover with a window formed therein. A pair of batteries is positioned in the housing. A lamp is mounted in the window of the cover. A pushbutton switch is mounted in the cover and manually depressible from outside the cover. Electrical conductors electrically connect the batteries in series and provide a DC output voltage and electrical conductors electrically connect the batteries in circuit with the lamp and the switch in a manner whereby manual depression of the switch closes the circuit with the batteries and the lamp. The lamp then indicates the power output condition of the batteries.

13 Claims, 1 Drawing Sheet

AIRCRAFT SYSTEM BATTERY PACK

BACKGROUND OF THE INVENTION

The present invention relates to a battery pack. More particularly, the invention relates to an aircraft system battery pack.

An electro-ballistic system or aircraft system requires instant start-up power at each system initiation point and a power pack or the equivalent is a necessity. In order to assure instant readiness, a power pack in an aircraft must be tested to determine the power output condition of its batteries. This is normally accomplished by a remote press-to-test button with a remote indicating light. The remote circuitry could be damaged or otherwise fail, in which case there would be no accurate indication of the condition of the power pack.

The principal object of the invention is to provide an aircraft system battery pack which is compact and sturdy and may readily be placed anywhere electro-ballistic power is required.

An object of the invention is to provide an aircraft system battery pack having a pair of batteries and its own simple self-test device to determine the power output condition of such batteries.

Another object of the invention is to provide an aircraft system battery pack having batteries in a sturdy housing having a test device to determine the power output condition of such batteries.

Still another object of the invention is to provide an aircraft system battery pack having a sturdy and secure housing with a sturdy and secure cover and a test device in the cover to determine the power output condition of the batteries in the pack.

Yet another object of the invention is to provide an aircraft system battery pack having high performance batteries, such as lithium batteries, which functions efficiently, effectively and reliably to provide required power.

Another object of the invention is to provide an aircraft system battery pack which is manually testable to indicate the power output condition of the batteries in the pack.

BRIEF SUMMARY OF THE INVENTION

In accordance with the invention, a battery pack comprises a housing, at least a pair of batteries in the housing, a lamp in the housing, an output terminal, and a switch in the housing. Electrical conductors in the housing electrically connect the batteries in series and provide a DC output voltage and electrical conductors electrically connect the batteries in circuit with the lamp and the switch in a manner whereby manual operation of the switch closes the circuit with the batteries and the lamp and the lamp indicates the power output condition of the batteries.

The housing comprises plastic material and has a removable cover with a window formed therein. The lamp is mounted in the cover in the window and the switch is mounted in the cover and is manually depressible from outside the cover to close the circuit.

In accordance with the invention, an aircraft system battery pack comprises a housing having a removable cover with a window formed therein. A pair of batteries is provided in the housing. A lamp is mounted in the window of the cover. An output terminal is provided. A pushbutton switch is mounted in the cover and manually depressible from outside the cover. Electrical conductors electrically connect the batteries in series or parallel and provide a DC output voltage and electrical conductors electrically connect the batteries in circuit with the lamp and the switch in a manner whereby manual depression of the switch closes the circuit with the batteries and the lamp and the lamp indicates the power output condition of the batteries.

In accordance with the invention, an electroballistic system battery pack comprises a housing having a removable cover with a window formed therein. A pair of batteries is provided in the housing. A lamp is mounted in the window of the cover. An output terminal is provided. A pushbutton switch is mounted in the cover and manually depressible from outside the cover. A circuit electrically connects the batteries in series to an output terminal and electrically connects the batteries in series or parallel with the lamp and the switch, whereby a DC output voltage is provided at the output terminal and depression of the switch closes the circuit with the batteries and the lamp and the lamp indicates by its brightness the power output condition of the batteries.

The housing and the cover comprise plastic material and the batteries comprise high performance batteries, such as lithium 24 volt DC batteries.

BRIEF DESCRIPTION OF THE DRAWINGS

Other objects and features of the present invention will become apparent from the following detailed description considered in connection with the accompanying drawings which discloses an embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENT

Figure 1:
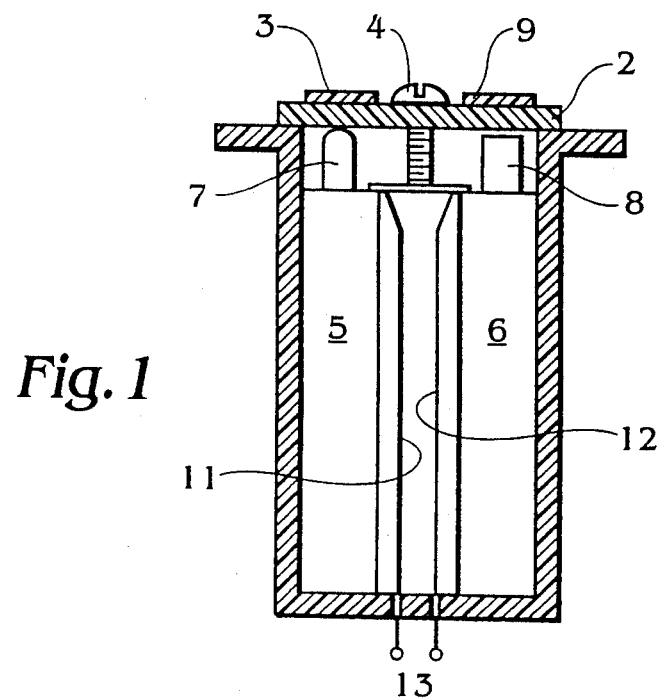
FIG. 1 is a side view, partly in section, of an embodiment of the aircraft system battery pack of the invention.
Figure 2:
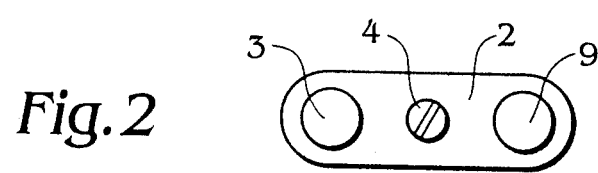
FIG. 2 is a top view of the cover of the embodiment of FIG. 1.

The aircraft system battery pack or electroballistic system battery pack of the invention comprises a housing 1, preferably of plastic material of any suitable known type and of any suitable configuration, having a removable cover 2 of the same material with a window 3 formed therein. The cover 2 may be secured to the housing 1 via a screw 4, for example.

A pair of batteries 5 and 6 are housed in the housing 1. The batteries are preferably high performance batteries, such as lithium 24 volt DC batteries. A lamp 7 of any suitable known type is mounted in the window 3 of the cover 2. A pushbutton switch 8 is mounted in the cover 2 and depressible from outside said cover via an area 9 of said cover.

Figure 3:
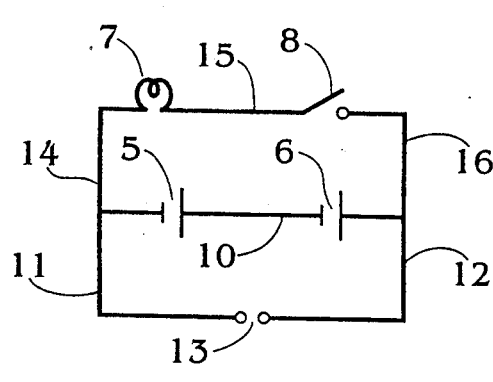
FIG. 3 is one embodiment of a circuit diagram of the embodiment of FIG. 1.

In the embodiment of FIG. 3, electrical conductors 10, 11 and 12 electrically connect the batteries 5 and 6 in series and to an output terminal 13. Electrical conductors 14, 15 and 16 electrically connect the batteries 5 and 6 in series with the lamp 7 and switch 8. Thus, a DC output voltage is provided at the output terminal 13. Furthermore, depression of the switch 8 closes the circuit 8, 15, 7, 14, 5, 10, 6, 16 of said switch with the batteries 5 and 6 and the lamp 7. The lamp 7 then indicates by its brightness the power output condition of the batteries 5 and 6.

Figure 4:
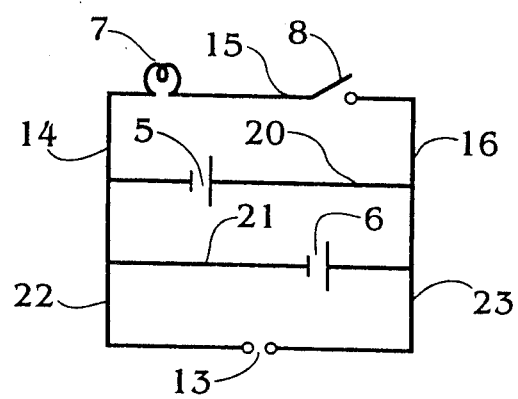
FIG. 4 is another embodiment of a circuit diagram of the embodiment of FIG. 1.

In the embodiment of FIG. 4, electrical conductors 20, 21, 22 and 23 electrically connect the batteries 5 and 6 in parallel and to the output terminal 13. Electrical conductors 14, 15 and 16 electrically connect the batteries 5 and 6 in parallel with the lamp 7 and switch S. The embodiment of FIG. 4 functions in the same manner as the embodiment of FIG. 3. Thus, a DC output voltage is provided at the output terminal 13 of title circuit of FIG. 4. Also, depression of the switch 8 closes the circuits 8, 15, 7, 14, 5, 20 and 16 and 8, 15, 7, 14, 6, 21 and 16 of said switch with the batteries 5 and 6 and the lamp 7. The lamp 7 of the circuit of FIG. 4 then indicates by its brightness the power output condition of the batteries 5 and 6.

While only a single embodiment of the present invention has been shown and described, it is to be understood that many changes and modifications may be made thereunto without departing from the spirit and scope of the invention as defined in the appended claims.

What is claimed is:

1. A battery pack, comprising
   a housing;
   at least a pair of batteries in said housing;
   a lamp in said housing;
   an output terminal;
   a switch in said housing; and
   electrical conductors electrically connecting said batteries in series and to provide a DC output voltage and electrical conductors electrically connecting said batteries in circuit, with said lamp and said switch in a manner whereby manual operation of said switch closes said circuit with said batteries and said lamp and said lamp indicates the power output condition of said batteries.

2. A battery pack as claimed in claim 1, wherein said housing has a window formed therein and said lamp is mounted in said window.

3. A battery pack as claimed in claim 1, wherein said housing has a removable cover with a window formed therein and said lamp is mounted in said window.

4. A battery pack as claimed in claim 1, wherein said housing comprises plastic material and said switch is manually depressible to close said circuit.

5. A battery pack as claimed in claim 1, wherein said housing has a removable cover with a window formed therein, said lamp is mounted in said cover in said window and said switch is mounted in said cover and is manually depressible from outside said cover to close said circuit.

6. An aircraft system battery pack, comprising
   a housing having a removable cover with a window formed therein;
   a pair of batteries in said housing;
   a lamp mounted in said window of said cover;
   an output terminal;
   a pushbutton switch mounted in said cover and manually depressible from outside said cover; and
   electrical conductors electrically connecting said batteries in one of series and parallel to provide a DC output voltage and electrical conductors electrically connecting said batteries in circuit with said lamp and said switch in a manner whereby manual depression of said switch closes said circuit with said batteries and said lamp and said lamp indicates the power output condition of said batteries.

7. An aircraft system battery pack as claimed in claim 6, wherein said housing and said cover comprise plastic material.

8. An aircraft system battery pack as claimed in claim 6, wherein said batteries comprise high performance batteries.

9. An aircraft system battery pack as claimed in claim 6, wherein said batteries comprise lithium batteries.

10. An aircraft system battery pack as claimed in claim 6, wherein said batteries comprise lithium 24 volt DC batteries.

11. An electro-ballistic system battery pack, comprising
    a housing having a removable cover with a window formed therein;
    a pair of batteries in said housing;
    a lamp mounted in said window of said cover;
    an output terminal;
    a pushbutton switch mounted in said cover and manually depressible from outside said cover; and
    circuit means electrically connecting said batteries in one of series and parallel to an output terminal and electrically connecting said batteries in series with said lamp and said switch, whereby a DC output voltage is provided at said output terminal and depression of said switch closes said circuit with said batteries and said lamp and said lamp indicates by its brightness the power output condition of said batteries.

12. An electro-ballistic system battery pack as claimed in claim 11, wherein said housing and said cover comprise plastic material.

13. An electro-ballistic system battery pack as claimed in claim 11, wherein said batteries comprise lithium 24 volt DC batteries.

* * * * *